United States Patent
Sparks et al.

(10) Patent No.: US 12,513,238 B2
(45) Date of Patent: Dec. 30, 2025

(54) PRESENTING CONTENT BASED ON A STATE CHANGE

(71) Applicant: Apple Inc., Cupertino, CA (US)

(72) Inventors: Lee Sparks, Lake Forest, CA (US); Manu Rastogi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 18/343,624

(22) Filed: Jun. 28, 2023

(65) Prior Publication Data
US 2024/0073317 A1 Feb. 29, 2024

Related U.S. Application Data

(60) Provisional application No. 63/400,350, filed on Aug. 23, 2022.

(51) Int. Cl.
*H04M 1/72454* (2021.01)
*H04M 1/72451* (2021.01)
*H04M 1/72457* (2021.01)

(52) U.S. Cl.
CPC ... *H04M 1/72454* (2021.01); *H04M 1/72451* (2021.01); *H04M 1/72457* (2021.01)

(58) Field of Classification Search
CPC ......... H04M 1/72454; H04M 1/72451; H04M 1/72457; G06F 1/163; G06F 1/1694; G06F 1/3287; G06F 3/013
See application file for complete search history.

(56) References Cited

U.S. PATENT DOCUMENTS

| | | | |
|---|---|---|---|
| 8,560,229 B1 * | 10/2013 | Park | G01C 21/20 701/516 |
| 8,768,648 B2 | 7/2014 | Panther et al. | |
| 9,352,207 B2 | 5/2016 | Balakrishnan et al. | |
| 10,521,846 B2 | 12/2019 | Jones et al. | |
| 2014/0125618 A1 * | 5/2014 | Panther | A61B 5/0022 345/173 |
| 2015/0054639 A1 * | 2/2015 | Rosen | H04W 4/80 340/439 |
| 2019/0129615 A1 * | 5/2019 | Sundar | G06F 9/451 |
| 2020/0250954 A1 * | 8/2020 | Tan | G08B 21/0446 |

* cited by examiner

*Primary Examiner* — Farid Seyedvosoghi
(74) *Attorney, Agent, or Firm* — Treyz Law Group, P.C.; Joseph F. Guihan

(57) ABSTRACT

An electronic device may maintain a list of possible locations for the electronic device and a list of possible activities for the electronic device. The electronic device may gather sensor data and determine the location and the activity for the electronic device based on the sensor data. In response to detecting a change in the location and/or activity, the electronic device may obtain additional sensor data using at least one sensor that was previously turned off. Using the additional sensor data, the electronic device may make a determination to present content to the user. In response to detecting the change in the location and/or activity, the electronic device may increase a sampling rate (and power consumption) of at least one sensor.

21 Claims, 4 Drawing Sheets

PRESENTING CONTENT BASED ON A STATE CHANGE

This application claims priority to U.S. provisional patent application No. 63/400,350, filed Aug. 23, 2022, which is hereby incorporated by reference herein in its entirety.

BACKGROUND

This relates generally to electronic devices, and, more particularly, to electronic devices with one or more sensors.

Some electronic devices include sensors for obtaining sensor data for a physical environment around the electronic device. If care is not taken, the sensors may consume more power than is desired.

SUMMARY

An electronic device may include one or more sensors, one or more processors, and memory storing instructions configured to be executed by the one or more processors, the instructions for: obtaining, via a first subset of the one or more sensors, first sensor data, selecting, based on the first sensor data, a location for the electronic device out of a list of locations and an activity for the electronic device out of a list of activities, and in accordance with a first determination that at least one of the location and the activity has changed: obtaining, via a second subset of the one or more sensors, second sensor data, wherein the second subset of the one or more sensors comprises at least one sensor that is not included in the first subset of the one or more sensors; and in accordance with a second determination, based on the second sensor data, presenting content.

DETAILED DESCRIPTION

Figure 1:
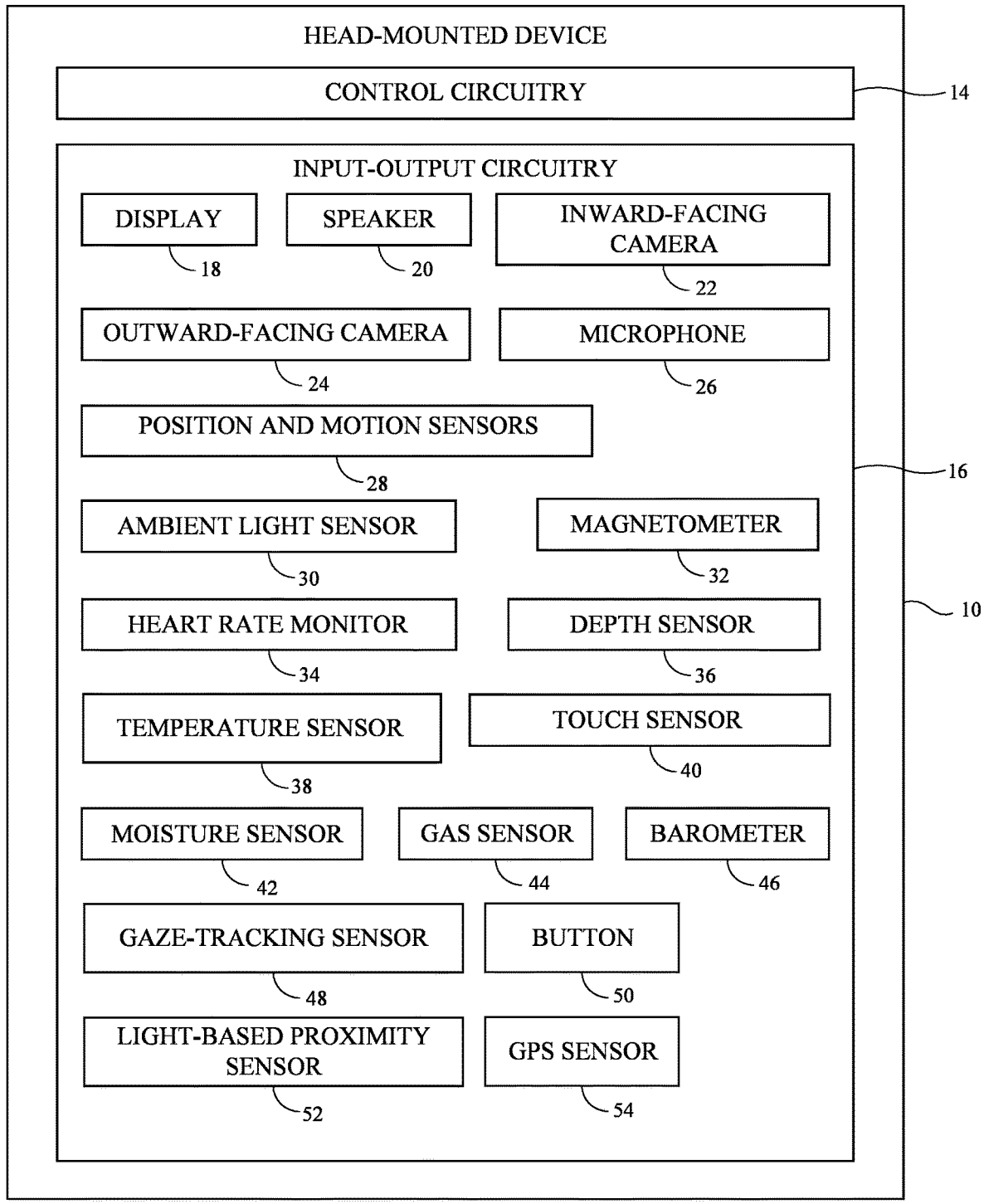
FIG. 1 is a schematic diagram of an illustrative electronic device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 16. Input-output circuitry 16 may be used to allow a user to provide head-mounted device 10 with user input. Input-output circuitry 16 may also be used to gather information on the environment in which head-mounted device 10 is operating. Output components in circuitry 16 may allow head-mounted device 10 to provide a user with output.

As shown in FIG. 1, input-output circuitry 16 may include a display such as display 18. Display 18 may be used to display images for a user of head-mounted device 10. Display 18 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18 is opaque, the display may also optionally display entirely computer-generated content (e.g., without displaying images of the physical environment).

Display 18 may include one or more optical systems (e.g., lenses) (sometimes referred to as optical assemblies) that allow a viewer to view images on display(s) 18. A single display 18 may produce images for both eyes or a pair of displays 18 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 16 may include various other input-output devices. For example, input-output circuitry 16 may include one or more speakers 20 that are configured to play audio and one or more microphones 26 that are configured to capture audio data from the user and/or from the physical environment around the user.

Input-output circuitry 16 may also include one or more cameras such as an inward-facing camera 22 (e.g., that face the user's face when the head-mounted device is mounted on the user's head) and an outward-facing camera 24 (that face the physical environment around the user when the head-mounted device is mounted on the user's head). Cameras 22 and 24 may capture visible light images, infrared images, or images of any other desired type. The cameras may be stereo cameras if desired. Inward-facing camera 22 may capture images that are used for gaze-detection operations, in one possible arrangement. Outward-facing camera 24 may capture pass-through video for head-mounted device 10.

As shown in FIG. 1, input-output circuitry 16 may include position and motion sensors 28 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 28, for example, control circuitry 14 can monitor the current direction in which a user's head is oriented relative to the surrounding environment (e.g., a user's head pose). One or more of cameras 22 and 24 may also be considered part of position and motion sensors 28. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16 may also include other sensors and input-output components if desired. As shown in FIG. 1, input-output circuitry 16 may include an ambient light sensor 30. The ambient light sensor may be used to measure ambient light levels around head-mounted device 10. The ambient light sensor may measure light at one or more wavelengths (e.g., different colors of visible light and/or infrared light).

Input-output circuitry 16 may include a magnetometer 32. The magnetometer may be used to measure the strength and/or direction of magnetic fields around head-mounted device 10.

Input-output circuitry 16 may include a heart rate monitor 34. The heart rate monitor may be used to measure the heart rate of a user wearing head-mounted device 10 using any desired techniques.

Input-output circuitry 16 may include a depth sensor 36. The depth sensor may be a pixelated depth sensor (e.g., that is configured to measure multiple depths across the physical environment) or a point sensor (that is configured to measure a single depth in the physical environment). The depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 16 may include a temperature sensor 38. The temperature sensor may be used to measure the temperature of a user of head-mounted device 10, the temperature of head-mounted device 10 itself, or an ambient temperature of the physical environment around head-mounted device 10.

Input-output circuitry 16 may include a touch sensor 40. The touch sensor may be, for example, a capacitive touch sensor that is configured to detect touch from a user of the head-mounted device.

Input-output circuitry 16 may include a moisture sensor 42. The moisture sensor may be used to detect the presence of moisture (e.g., water) on, in, or around the head-mounted device.

Input-output circuitry 16 may include a gas sensor 44. The gas sensor may be used to detect the presence of one or more gasses (e.g., smoke, carbon monoxide, etc.) in or around the head-mounted device.

Input-output circuitry 16 may include a barometer 46. The barometer may be used to measure atmospheric pressure, which may be used to determine the elevation above sea level of the head-mounted device.

Input-output circuitry 16 may include a gaze-tracking sensor 48 (sometimes referred to as gaze-tracker 48 and gaze-tracking system 48). The gaze-tracking sensor 48 may include a camera and/or other gaze-tracking sensor components (e.g., light sources that emit beams of light so that reflections of the beams from a user's eyes may be detected) to monitor the user's eyes. Gaze-tracker 48 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 48 is merely illustrative.

Input-output circuitry 16 may include a button 50. The button may include a mechanical switch that detects a user press during operation of the head-mounted device.

Input-output circuitry 16 may include a light-based proximity sensor 52. The light-based proximity sensor may include a light source (e.g., an infrared light source) and an image sensor (e.g., an infrared image sensor) configured to detect reflections of the emitted light to determine proximity to nearby objects.

Input-output circuitry 16 may include a global positioning system (GPS) sensor 54. The GPS sensor may determine location information for the head-mounted device. The GPS sensor may include one or more antennas used to receive GPS signals. The GPS sensor may be considered a part of position and motion sensors 28.

Input-output circuitry 16 may include any other desired components (e.g., capacitive proximity sensors, other proximity sensors, strain gauges, pressure sensors, audio components, haptic output devices such as vibration motors, light-emitting diodes, other light sources, etc.). Head-mounted device 10 may also include communication circuitry to allow the head-mounted device to communicate with external electronic equipment (e.g., a tethered computer, a portable device such as a handheld device or laptop computer, or other electrical equipment). The communication circuitry may be used for both wired and wireless communication with external electronic equipment.

During operation of head-mounted device 10, it may be desirable to determine a state associated with the head-mounted device. Content may be presented to the user based on the state of the head-mounted device. For example, if the user starts driving, content associated with driving may be presented to the user.

Figure 2:
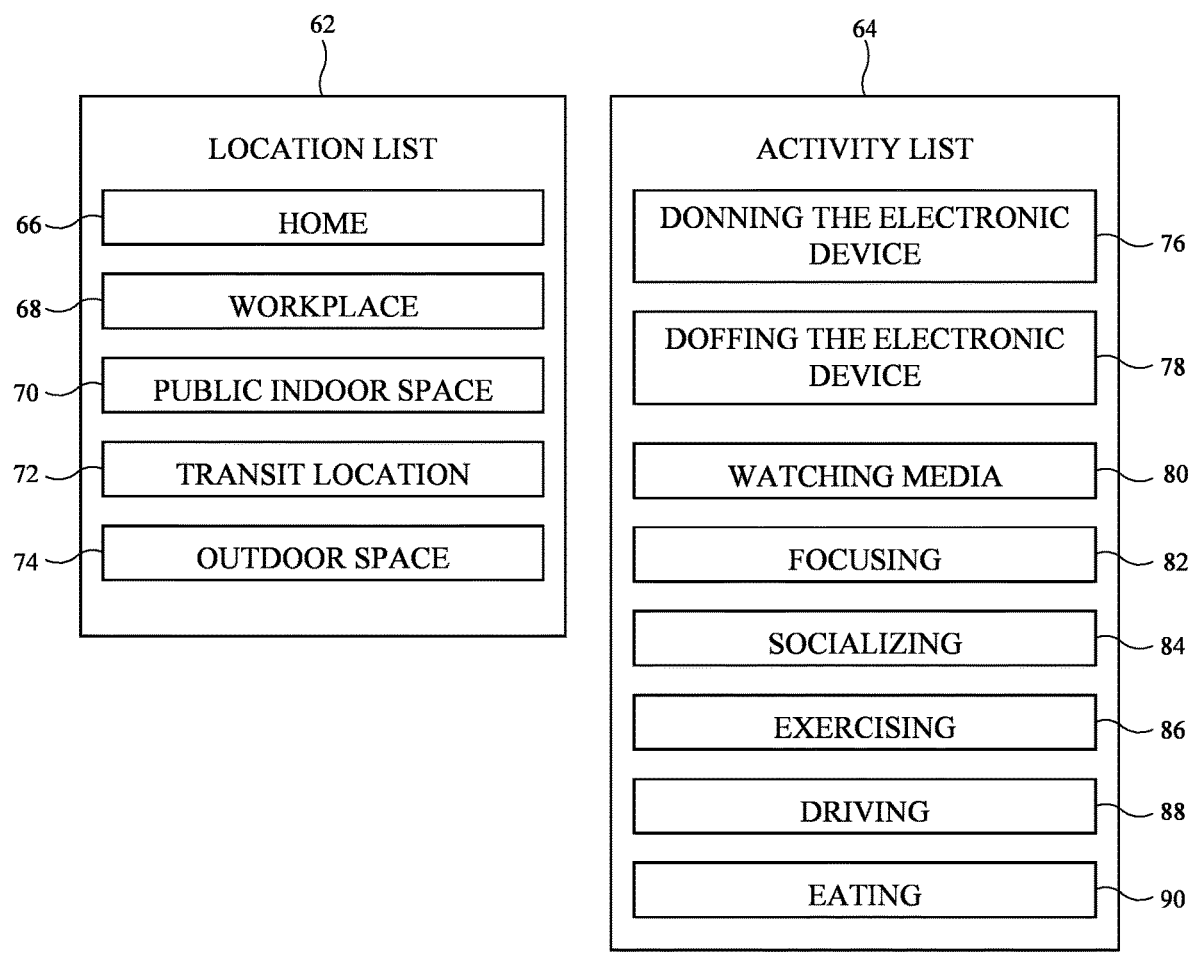
FIG. 2 is a diagram of a location list and an activity list that may be used in an illustrative electronic device in accordance with some embodiments.

The state for the head-mounted device may include a location and an activity. As shown in FIG. 2, head-mounted device 10 may maintain (e.g., stored in memory of control circuitry 14) a list 62 of possible locations for the head-mounted device and a list 64 of possible activities for the head-mounted device. Location list 62 includes five locations: home 66 (e.g., the home of the user of the head-mounted device), workplace 68 (e.g., an office or other place-of-focus for the user of the head-mounted device), public indoor space 70 (e.g., stores, restaurants, etc.), transit location 72 (e.g., in a car, train, plane, bus, etc.), and outdoor space 74. Activity list 64 includes eight activities: donning the electronic device 76, doffing the electronic device 78, watching media 80, focusing 82, socializing 84, exercising 86, driving 88, and eating 90.

The examples of locations and activities in lists 62 and 64 are merely illustrative. In general, the location list may include any desired locations and the activity list may include any desired activities.

Head-mounted device 10 may use input from one or more sensors to determine the location (out of the list of locations 62) and the activity (out of the list of activities 64) for the head-mounted device 10. To reduce the power consumption and processing power used during operation of the head-mounted device, the number of sensors turned on and/or the sampling frequency of the sensors may be reduced when determining the location and activity for the head-mounted device. When a change in state (e.g., location and/or activity) is detected, additional sensors may be turned on and/or the sampling frequency of one or more sensors may be increased to determine additional contextual information. Content may then be presented to the user (e.g., using display 18 and/or speaker 20) using the previous state of the head-mounted device, the current state of the head-mounted device, and/or the additional contextual information determined after the change in state is detected.

The number of items in the location list 62 and activity list 64 may be sufficiently small to allow selection of the current location and activity without requiring excessive power consumption and/or processing power. The number of items in list 62 may be less than 20, less than 15, less than 10, less than 8, greater than 2, greater than 4, greater than 6, between (and including) 2 and 6, between (and including) 2 and 12, etc. The number of items in list 64 may be less than 20, less than 15, less than 10, less than 8, greater than 2, greater than 4, greater than 6, between (and including) 2 and 6, between (and including) 2 and 12, etc.

Figure 3:
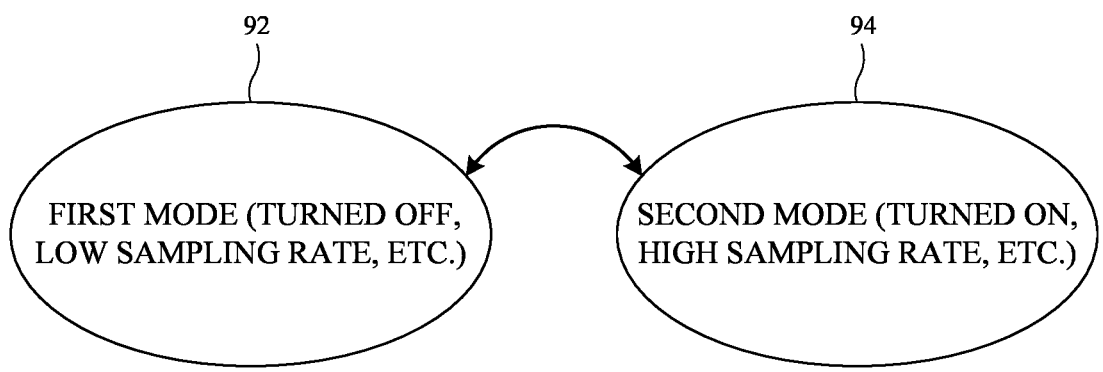
FIG. 3 is a state diagram showing illustrative operating modes for a sensor in an electronic device in accordance with some embodiments.

As shown by the state diagram in FIG. 3, each component (sensor) in input-output circuitry 16 may optionally be operable in a first mode 92 and a second mode 94. The second mode has a higher associated power consumption than the first mode. In general, the sensor may provide more and/or better (e.g., higher resolution) data in the second mode compared to the first mode. As an example, a first given sensor may be turned off while in the first mode and turned on while in the second mode. As another example, a second given sensor may be turned on in both the first mode and the second mode. However, the second given sensor may operate with a first sampling rate (e.g., a low sampling rate) in the first mode and a second sampling rate (e.g., a high sampling rate) that is greater than the first sampling rate in the second mode.

The sensors of input-output circuitry 16 may operate in the first mode 92 to obtain sensor data that is used select a location for the head-mounted device 10 out of location list 62 and an activity for the head-mounted device 10 out of activity list 64. When it is determined that the activity and/or location of the head-mounted device 10 has changed, one or more sensors may switch from the first mode to the second mode 94 (with a higher power consumption than the first mode). Operating the sensors in the second mode 94 upon detection of a state change (e.g., a change in location and/or activity) may allow the head-mounted device 10 to gather additional information (e.g., additional contextual information) immediately after the state change (when the additional sensor data will be particularly useful in determining what content to present to the user).

For example, consider an outward-facing camera 24 in head-mounted device 10. While selecting a location for the head-mounted device 10 out of location list 62 and an activity for the head-mounted device 10 out of activity list 64, the outward-facing camera 24 may operate in first mode 92. For outward-facing camera 24, the camera is turned on and operates with a first sampling frequency (e.g., 1 Hz) while in the first mode. In response to a determination that the activity and/or location of the head-mounted device 10 has changed, the outward-facing camera 24 may switch from the first mode 92 to the second mode 94. For outward-facing camera 24, the camera is turned on and operates with a second sampling frequency (e.g., 60 Hz) that is greater than the first frequency while in the second mode. The power consumption of outward-facing camera 24 is lower in the first mode than in the second mode. In this way, power consumption of outward-facing camera 24 is reduced while selecting the location and the activity for the head-mounted device 10. Then, when change in activity and/or location is detected, additional power consumption for outward-facing camera 24 is permitted to gather additional information immediately after the state change (when the additional sensor data will be particularly useful in determining what content to present to the user).

As a specific example, the head-mounted device 10 may be determined to have a location of home and an activity of focusing. The outward-facing camera 24 may be in the first mode (e.g., with a 1 Hz sampling frequency) while the location and activity are monitored (and continuously determined to be home and focusing). Then, using at least the 1 Hz sampling frequency sensor data from the outward-facing camera, there may be a determination that the activity has changed from focusing to watching media. In response to the change in activity, the outward-facing camera 24 may be switched from the first mode to the second mode (e.g., with a 60 Hz sampling frequency). Based on the previous activity (e.g., focusing), the new activity (e.g., watching media), and/or additional information determined using the outward-facing camera data while the outward-facing camera operates in the second mode, content may be presented to the user.

As another example, consider a temperature sensor 38 in head-mounted device 10. While selecting a location for the head-mounted device 10 out of location list 62 and an activity for the head-mounted device 10 out of activity list 64, the temperature sensor 38 may be in first mode 92. For temperature sensor 38, the temperature sensor is turned off while in the first mode. In other words, the data from temperature sensor 38 is not needed to select the location and activity for the head-mounted device 10. In response to a determination that the activity and/or location of the head-mounted device 10 has changed, the temperature sensor may switch from the first mode 92 to the second mode 94. For temperature sensor 38, the temperature sensor is turned on while in the second mode. The power consumption of temperature sensor 38 is lower in the first mode than in the second mode. In this way, power consumption of temperature sensor 38 is reduced while selecting the location and the activity for the head-mounted device 10. Then, when change in activity and/or location is detected, additional power consumption for temperature sensor 38 is permitted to gather additional information immediately after the state change (when the additional sensor data will be particularly useful in determining what content to present to the user).

As a specific example, the head-mounted device 10 may be determined to have a location of home and an activity of socializing. The temperature sensor 38 may be in the first mode (e.g., turned off) while the location and activity are monitored (and continuously determined to be home and socializing). Other sensors that operate in the first mode may be used to determine a change in location from home to outdoor space. For example, an ambient light sensor may detect an increase in ambient light levels indicating a move into the outdoor space. In response to the change in location, the temperature sensor may be switched from the first mode (e.g., where the temperature sensor is turned off) to the second mode (e.g., where the temperature sensor is turned on). Based on the previous location (e.g., home), the new location (e.g., outdoor space), and/or additional information determined using the temperature sensor while the temperature sensor operates in the second mode, content may be presented to the user.

Figure 4:
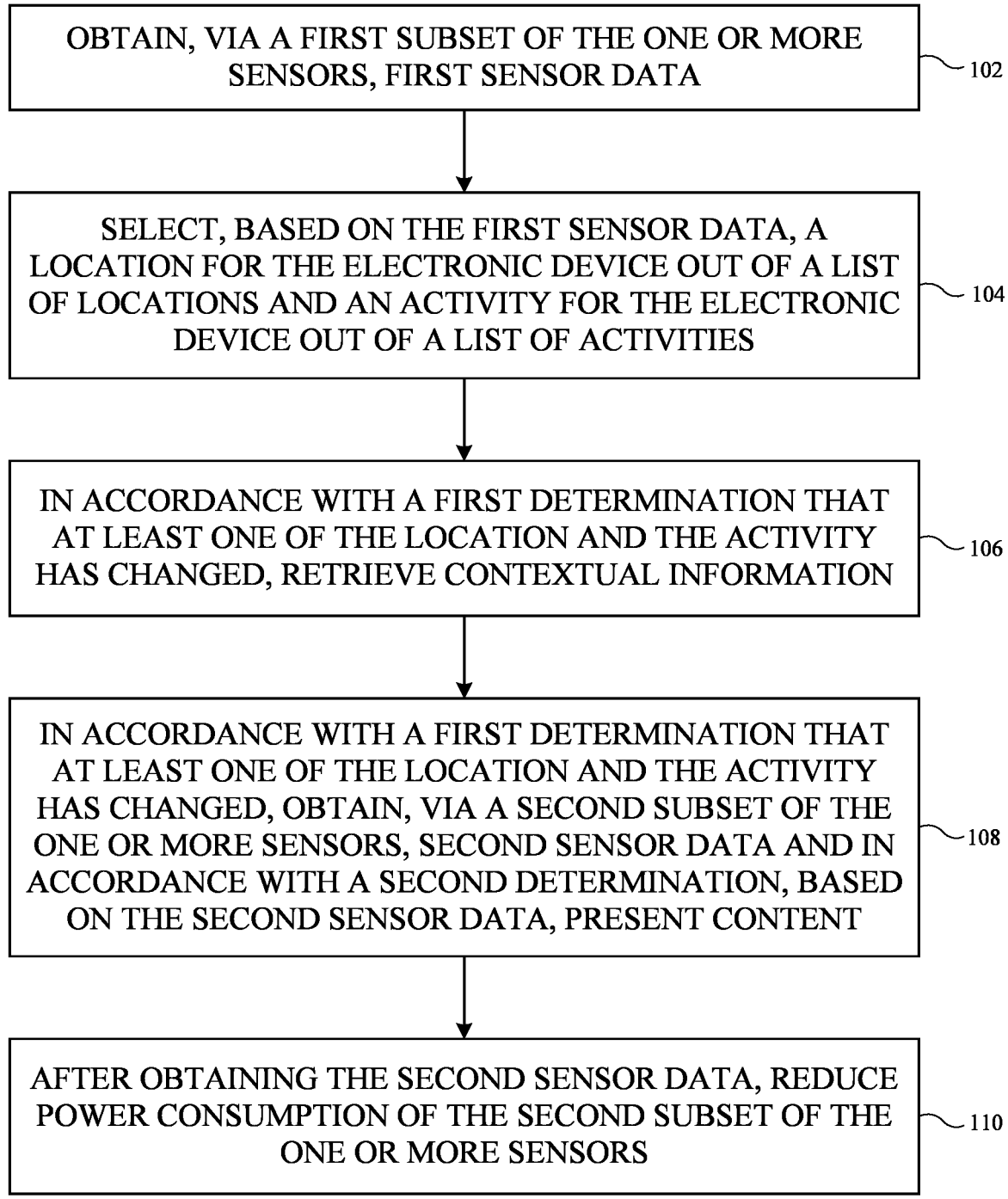
FIG. 4 is a flowchart showing an illustrative method for operating an electronic device in accordance with some embodiments.

FIG. 4 is a flowchart showing an illustrative method performed by a head-mounted device (e.g., control circuitry 14 in device 10). The blocks of FIG. 4 may be stored as instructions in memory of head-mounted device 10, with the instructions configured to be executed by one or more processors in the head-mounted device.

During the operations of block 102, the head-mounted device may obtain, via a first subset of the sensors in the head-mounted device, first sensor data. At least some of the first subset of the sensors may operate in a low power-consuming mode (e.g., the first mode 92 in FIG. 3) during the operations of block 102. In other words, any sensor that gathers sensor data during the operations of block 102 may optionally operate at a relatively low sampling frequency during the operations of block 102.

The sensors used to obtain the first sensor data may include any of the sensors in the head-mounted device (e.g., inward-facing camera 22, outward-facing camera 24, microphone 26, position and motion sensors 28 such as an accelerometer, compass, and/or gyroscope, ambient light sensor 30, magnetometer 32, heart rate monitor 34, depth sensor 36, temperature sensor 38, touch sensor 40, moisture sensor 42, gas sensor 44, barometer 46, gaze-tracking sensor 48, button 50, light-based proximity sensor 52, GPS sensor 54, etc.).

During the operations of block 104, the head-mounted device may select, based on the first sensor data obtained during block 102, a location for the electronic device out of a list of locations (e.g., location list 62 in FIG. 2) and an activity for the electronic device out of a list of activities (e.g., activity list 64 in FIG. 2).

To mitigate power consumption, a reduced number of sensors may be included in the first subset of the one or more sensors. Said another way, only sensors needed to select the location and activity for the head-mounted device are used to gather the first sensor data. Depending on power consumption requirements for head-mounted device 10, extraneous sensors may operate during the operations of block 102 (e.g., for greater certainty in determining the activity and location for the head-mounted device).

As one specific example, the first sensor data may include audio data from microphone 26, global positioning system (GPS) data from GPS sensor 54, ambient light sensor data from ambient light sensor 30, position and motion data from position and motion sensors 28, magnetic field data from magnetometer 32, gaze-detection data from gaze-tracking sensor 48, and heart rate data from heart rate monitor 34. This data may be sufficient to select a location and activity for the head-mounted device during the operations of block 104. In this example, inward-facing camera 22, outward-facing camera 24, depth sensor 36, temperature sensor 38, touch sensor 40, moisture sensor 42, gas sensor 44, barometer 46, and/or light-based proximity sensor 52 may be turned off during the operations of block 102. This example is merely illustrative. In general, any subset of the sensors in head-mounted device 10 may be turned on during the operations of block 102. Similarly, any subset of the sensors in head-mounted device 10 may be turned off during the operations of block 102.

It is noted that some sensors may selectively be turned on during the operations of block 102. For example, during the operations of block 102 and 104, a microphone may obtain audio data that indicates a possible state change. In response, an outward-facing camera may be turned on. One or more images from the outward-facing camera may be analyzed to determine if the activity and/or location of the user has changed.

During the operations of block 106, in accordance with a first determination that at least one of the location and the activity has changed, the head-mounted device may retrieve additional contextual information. Retrieving the additional contextual information may include, for example, retrieving the additional contextual information from memory within head-mounted device 10 (e.g., within control circuitry 14). Retrieving the additional contextual information may also include sending a request for additional contextual information to external electronic equipment. The request to the external electronic equipment may be sent wirelessly (e.g., using cellular communication, Bluetooth communication, etc.) or over a wired link. The external electronic equipment (that provides additional contextual information) may include one or more external servers, an electronic device that is paired with the head-mounted device (such as a cellular telephone, a laptop computer, a speaker, a computer monitor, an electronic watch, a tablet computer, earbuds, etc.), a vehicle, an internet of things (IoT) device (e.g., remote control, light switch, doorbell, lock, smoke alarm, light, thermostat, oven, refrigerator, stove, grill, coffee maker, toaster, microwave, etc.).

The retrieved contextual information from block 106 may include tiredness information (e.g., based on sleep statistics for the user), daily activity information (e.g., the number of steps the user has taken that day, the amount of exercise the user has performed that day, etc.), calendar information (e.g., the time and length of appointments on the user's calendar), information regarding external electronic equipment (such as any of the external electronic equipment described above), etc.

Retrieving contextual information during the operations of block 106 may include performing additional analysis on sensor data. For example, speech recognition analysis may be performed on audio data during the operations of block 106.

During the operations of block 108, in accordance with a first determination that at least one of the location and the activity has changed, the head-mounted device may obtain, via a second subset of the one or more sensors, second sensor data. The second subset of the one or more sensors may include at least one sensor that is not included in the first subset of the one or more sensors. In other words, at least one sensor may be turned off during the operations of block 102 and then turned on during the operations of block 108.

At least one sensor may be turned on (in a given mode) during the operations of block 102 and turned on (in the given mode) during the operations of block 108. In other words, at least one sensor may operate in the same mode (e.g., with the same power consumption) during the operations of both block 102 and block 108.

At least one sensor may be turned on (in a first mode) during the operations of block 102 and turned on (in a second, different mode) during the operations of block 108. In other words, at least one sensor may operate in different modes during the operations of block 102 and block 108. The at least one sensor may operate in a mode with higher power consumption (e.g., a higher sampling frequency) during the operations of block 108 than during the operations of block 102.

Consider the example above where the first sensor data (from block 102) includes audio data from microphone 26, global positioning system (GPS) data from GPS sensor 54, ambient light sensor data from ambient light sensor 30, position and motion data from position and motion sensors 28, magnetic field data from magnetometer 32, gaze-detection data from gaze-tracking sensor 48, and heart rate data from heart rate monitor 34, and inward-facing camera 22, outward-facing camera 24, depth sensor 36, temperature sensor 38, touch sensor 40, moisture sensor 42, gas sensor 44, barometer 46, and/or light-based proximity sensor 52 are turned off during the operations of block 102. In this example, at least one of inward-facing camera 22, outward-facing camera 24, depth sensor 36, temperature sensor 38, touch sensor 40, moisture sensor 42, gas sensor 44, barometer 46, and/or light-based proximity sensor 52 is turned off during the operations of block 102 and turned on during the operations of block 108. At least one of microphone 26, GPS sensor 54, ambient light sensor 30, position and motion sensors 28, magnetometer 32, gaze-tracking sensor 48, and heart rate monitor 34 may operate in the same mode during the operations of blocks 102 and 108 (e.g., may operate in a relatively high power consumption mode such as the second mode 94 in FIG. 3). At least one of microphone 26, GPS sensor 54, ambient light sensor 30, position and motion sensors 28, magnetometer 32, gaze-tracking sensor 48, and heart rate monitor 34 may operate in different modes during the operations of blocks 102 and 108 (e.g., may operate in a relatively low power consumption mode such as the first mode 92 during the operations of block 102 and then may operate in a relatively high power consumption mode such as the second mode 94 during the operations of block 108).

During the operations of block 108, the head-mounted device may, in accordance with the first determination that at least one of the location and the activity has changed and in accordance with a second determination that is based on the second sensor data, present content.

The presented content may be based on the first sensor data (from block 102) and/or the second sensor data (from block 108). When the head-mounted device determines a change in location from a first (old) location to a second (new) location, the presented content may be based on the old location and/or the new location. When the head-mounted device determines a change in activity from a first (old) activity to a second (new) activity, the presented content may be based on the old activity and/or the new activity. When the head-mounted device determines a change in location and activity, the presented content may be based on the old activity, the old location, the new activity, and/or the new location.

For example, consider a first scenario in which a user is, at a first time, exercising at home. The user then changes state, at a second time, to be eating at home (e.g., the activity, but not the location, has changed). At the second time, first content may be presented to the user based on the previous activity (exercising), the new activity (eating), and the location (home).

In a second scenario, a user is, at a first time, watching media at home. The user then changes state, at a second time, to be eating at home (e.g., the activity, but not the location, has changed). At the second time, second content that is different than the first content may be presented to the user based on the previous activity (watching media), the new activity (eating), and the location (home).

In other words, in the first and second scenarios above, the user has the same state (eating at home) at the second time. However, different content is presented in the different scenarios due to the old activity being different in the different scenarios. This shows how the previous state may inform the content presented in the new state (e.g., the content presented is not dependent solely on the current state).

The content presented during the operations of block 108 may be visual content presented using display 18, audio content presented using speaker 20, etc. The visual content may include world-locked, body-locked, and/or head-locked virtual objects.

During the operations of block 110, after obtaining the second sensor data, the head-mounted device may reduce power consumption of the second subset of the one or more sensors (that are used during the operations of block 108). Reducing the power consumption of the second subset of the one or more sensors may include ceasing to obtain sensor data using the second subset of the one or more sensors, turning off the second subset of the one or more sensors, reducing the sampling frequency of the second subset of the one or more sensors, and/or operating the second subset of the one or more sensors in a mode with lower power consumption than during the operations of block 108.

Also during the operations of block 110, after obtaining the second sensor data and presenting the content during the operations of block 108, the head-mounted device may continue to obtain, via the first subset of the one or more sensors, the first sensor data (as in block 102) and select, based on the first sensor data, the location for the electronic device out of the list of locations and the activity for the electronic device out of the list of activities (as in block 104).

Using the second subset of the one or more sensors only when a state change is detected (e.g., during the operations of block 108) has the benefit of reducing interruptions by presenting content when it is more likely to be acceptable to the user. Additionally, using the second subset of the one or more sensors only when a state change is detected has the benefit of reducing power consumption by reducing how often contextual content is presented to the user.

Out of an abundance of caution, it is noted that to the extent that any implementation of this technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
   one or more sensors;
   one or more processors; and
   memory storing instructions configured to be executed by the one or more processors, the instructions for:
   obtaining, via a first subset of the one or more sensors, first sensor data;
   selecting, based on the first sensor data, a location for the electronic device out of a list of locations and an activity for the electronic device out of a list of activities; and
   in accordance with a first determination that at least one of the location and the activity has changed:
   obtaining, via a second subset of the one or more sensors, second sensor data, wherein the second subset of the one or more sensors comprises at least one sensor that is not included in the first subset of the one or more sensors; and
   in accordance with a second determination, based on the second sensor data, presenting content, wherein the first determination that at least one of the location and the activity has changed comprises the first determination that the location has changed from a first location to a second, different location and the activity has not changed and wherein the content is based on the first location and the second location.

2. The electronic device defined in claim 1, wherein the list of locations comprises a home, a workplace, a public indoor space, a transit location, and an outdoor space.

3. The electronic device defined in claim 1, wherein the list of activities comprises donning the electronic device, doffing the electronic device, watching media, focusing, socializing, exercising, driving, and eating.

4. The electronic device defined in claim 1, wherein the first subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, a gas sensor, or a global positioning system (GPS) sensor.

5. The electronic device defined in claim 1, wherein the second subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, or a gas sensor.

6. The electronic device defined in claim 1, wherein the instructions further comprise instructions for:
in accordance with the first determination that at least one of the location and the activity has changed, retrieving contextual information, wherein the content is based on the retrieved contextual information and wherein the retrieved contextual information comprises tiredness information, daily activity information, calendar information, or information regarding external electronic equipment.

7. The electronic device defined in claim 1, wherein obtaining, via the second subset of the one or more sensors, the second sensor data comprises operating the second subset of the one or more sensors in a first mode and wherein the instructions further comprise instructions for:
after obtaining the second sensor data, operating the second subset of the one or more sensors in a second mode with lower power consumption than in the first mode.

8. A method of operating an electronic device that comprises one or more sensors, the method comprising:
obtaining, via a first subset of the one or more sensors, first sensor data;
selecting, based on the first sensor data, a location for the electronic device out of a list of locations and an activity for the electronic device out of a list of activities; and
in accordance with a first determination that at least one of the location and the activity has changed:
obtaining, via a second subset of the one or more sensors, second sensor data, wherein the second subset of the one or more sensors comprises at least one sensor that is not included in the first subset of the one or more sensors; and
in accordance with a second determination, based on the second sensor data, presenting content, wherein the first determination that at least one of the location and the activity has changed comprises the first determination that the location has changed from a first location to a second, different location and the activity has not changed and wherein the content is based on the first location and the second location.

9. The method defined in claim 8, wherein the list of locations comprises a home, a workplace, a public indoor space, a transit location, and an outdoor space.

10. The method defined in claim 8, wherein the list of activities comprises donning the electronic device, doffing the electronic device, watching media, focusing, socializing, exercising, driving, and eating.

11. The method defined in claim 8, wherein the first subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, a gas sensor, or a global positioning system (GPS) sensor.

12. The method defined in claim 8, wherein the second subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, or a gas sensor.

13. The method defined in claim 8, further comprising:
in accordance with the first determination that at least one of the location and the activity has changed, retrieving contextual information, wherein the content is based on the retrieved contextual information and wherein the retrieved contextual information comprises tiredness information, daily activity information, calendar information, or information regarding external electronic equipment.

14. The method defined in claim 8, wherein obtaining, via the second subset of the one or more sensors, the second sensor data comprises operating the second subset of the one or more sensors in a first mode and wherein the method further comprises:
after obtaining the second sensor data, operating the second subset of the one or more sensors in a second mode with lower power consumption than in the first mode.

15. A non-transitory computer-readable storage medium of operating an electronic device that comprises one or more sensors, the one or more programs including instructions for:
obtaining, via a first subset of the one or more sensors, first sensor data;
selecting, based on the first sensor data, a location for the electronic device out of a list of locations and an activity for the electronic device out of a list of activities; and
in accordance with a first determination that at least one of the location and the activity has changed:
obtaining, via a second subset of the one or more sensors, second sensor data, wherein the second subset of the one or more sensors comprises at least one sensor that is not included in the first subset of the one or more sensors; and
in accordance with a second determination, based on the second sensor data, presenting content, wherein the first determination that at least one of the location and the activity has changed comprises the first determination that the location has changed from a first location to a second, different location and the activity has not changed and wherein the content is based on the first location and the second location.

16. The non-transitory computer-readable storage medium defined in claim 15, wherein the list of locations comprises a home, a workplace, a public indoor space, a transit location, and an outdoor space.

17. The non-transitory computer-readable storage medium defined in claim 15, wherein the list of activities comprises donning the electronic device, doffing the electronic device, watching media, focusing, socializing, exercising, driving, and eating.

18. The non-transitory computer-readable storage medium defined in claim 15, wherein the first subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, a gas sensor, or a global positioning system (GPS) sensor.

19. The non-transitory computer-readable storage medium defined in claim 15, wherein the second subset of the one or more sensors comprises a microphone, an ambient light sensor, an accelerometer, a magnetometer, an inward-facing camera, an outward-facing camera, a heart rate monitor, a depth sensor, a temperature sensor, a touch sensor, a gyroscope, a compass, a moisture sensor, or a gas sensor.

20. The non-transitory computer-readable storage medium defined in claim 15, wherein the instructions further comprise instructions for:

in accordance with the first determination that at least one of the location and the activity has changed, retrieving contextual information, wherein the content is based on the retrieved contextual information and wherein the retrieved contextual information comprises tiredness information, daily activity information, calendar information, or information regarding external electronic equipment.

21. The non-transitory computer-readable storage medium defined in claim 15, wherein obtaining, via the second subset of the one or more sensors, the second sensor data comprises operating the second subset of the one or more sensors in a first mode and wherein the instructions further comprise instructions for:

after obtaining the second sensor data, operating the second subset of the one or more sensors in a second mode with lower power consumption than in the first mode.

\* \* \* \* \*